(12) United States Patent
Colbert

(10) Patent No.: US 7,169,033 B1
(45) Date of Patent: Jan. 30, 2007

(54) SEAFOOD SHELLER

(76) Inventor: Norman V. Colbert, 1013 Findley Dr., E., Apt., #6, Pittsburgh, PA (US) 15221

( * ) Notice: Subject to any disclaimer, the term of this patent is extended or adjusted under 35 U.S.C. 154(b) by 0 days.

(21) Appl. No.: 11/255,463

(22) Filed: Oct. 21, 2005

(51) Int. Cl.
A22B 5/10 (2006.01)

(52) U.S. Cl. ...................................................... 452/103
(58) Field of Classification Search ................ 452/2–6, 452/102–105; 30/120.1, 120.2, 120.3, 120.4, 30/120.5
See application file for complete search history.

(56) References Cited

U.S. PATENT DOCUMENTS

| | | | |
|---|---|---|---|
| 2,594,205 A | | 4/1952 | Paoli |
| 2,596,382 A | * | 5/1952 | Duke .......................... 30/120.3 |
| 2,753,905 A | * | 7/1956 | Anderson .................... 30/120.3 |
| 3,178,765 A | | 4/1965 | Gorton, Jr. |
| 3,353,207 A | | 9/1965 | Weinberger |
| 3,685,097 A | * | 8/1972 | Scott et al. .................... 452/17 |
| 3,706,114 A | * | 12/1972 | Waechter ...................... 452/17 |
| 3,831,274 A | | 8/1974 | Horrocks |
| 4,477,943 A | | 10/1984 | Grush, Jr. |
| 4,519,136 A | * | 5/1985 | Walker ......................... 30/142 |
| 4,716,627 A | * | 1/1988 | Scott, Jr. ....................... 452/6 |
| 4,771,512 A | | 9/1988 | Kribbs |
| 4,905,350 A | * | 3/1990 | Gardner ........................ 452/16 |
| 5,108,343 A | * | 4/1992 | Gilliam ......................... 452/6 |
| 5,351,402 A | * | 10/1994 | Mansfield .................. 30/120.3 |
| 5,613,904 A | * | 3/1997 | LaSalle et al. ................. 452/6 |
| 6,036,596 A | | 3/2000 | Lay |
| 6,129,622 A | | 10/2000 | Seaman et al. |
| 6,390,911 B1 | | 5/2002 | Lombardo |
| 6,503,137 B2 | * | 1/2003 | Maille ......................... 452/17 |
| 6,817,937 B1 | * | 11/2004 | Merritt ....................... 452/103 |

* cited by examiner

Primary Examiner—Thomas Price
(74) Attorney, Agent, or Firm—James Ray & Assoc.

(57) ABSTRACT

Apparatus for cutting through seafood shell includes a first and second elongated member. The first member includes a handle portion disposed at a first end thereof and a jaw like portion disposed at a radially opposed end. The jaw like portion includes each of a relatively pointed nose and a relatively sharp tapered portion having a plurality of serrations disposed on an upper surface which extend from the nose back toward the handle for assisting in cutting through such shell. The second member includes a handle portion disposed at a first end thereof and a jaw like portion disposed at a radially opposed end. The jaw like portion includes each of a relatively blunt arcuately shaped nose portion and a relatively wide gripping portion for cooperating with the first jaw portion in cutting through such shell of such seafood. There is a first mechanism engageable with each of the first and second members intermediate each end thereof for pivotably connecting them together.

14 Claims, 2 Drawing Sheets

SEAFOOD SHELLER

FIELD OF THE INVENTION

The present invention relates, in general, to an apparatus for shelling seafood and, more particularly, the instant invention relates to an improved apparatus for shelling seafood, to uncover the edible portion, which includes a scissors type power assist mechanism.

BACKGROUND OF THE INVENTION

Prior to the conception and development of the present invention, the popularity of shellfish such as lobsters, crabs, shrimp, scampi and the like is generally well known despite the relative difficulty encountered in removing the meat portion from the shell. Indeed, shellfish are often served in their shell which must then be opened or removed in order to remove the edible portion.

Various tools and utensils have been proposed in the prior art for assisting an intended user in separating the meat from the hard shell portion of conventional shellfish. One particular class of tools or utensils that is presently available commercially, utilizes the principle of cracking the shell.

Generally, such cracking tools being used have pivoting members providing for the placement of the shell to be cracked between the pivoting members. An intended user then applies a compressive force to the pivoting members to compress and crack the shellfish. A second type employs a hammer or mallet for cracking the shell. The cracked shell is then removed in pieces to expose the meat.

Both the cracking and the hammering procedures presently being used can result in trauma to the hand from the sharp edges and projections of the shell. Additionally, protective clothing such as a bib, or apron, is usually necessary to avoid soiling underlying clothing.

Another drawback associated with such prior art methods and apparatus relates to the fact that the compressive force imparted on the meat often damages the latter making it less attractive to the diner.

A second class of tools attempting to circumvent the herein above mentioned disadvantages by using a cutting action. The typical tool opens and closes like pliers with jaws that are notched and concave to hold the shellfish and crack the same when pressure is applied to the handles. This type of tool includes a relatively sharp severing section.

Another class of prior art tools involves the use of relatively sharp objects. One such tool includes a planar blade with an open handed slot extending linearly from a terminal end of the blade along the longitudinal axis of the blade. The slot symmetrically divides the blade into two identical sections. In use, one section of the knife is inserted into the interior of the shellfish section, with the other section straddling the exterior of the shell. By lifting upwardly on the knife, the knife is rotated about its terminal end and acts as lever to break the shell.

However, because a pointed edge is formed at the terminal end of the external fork by the linear slot, lifting of the utensil causes the pointed edge to piece the shell of the shellfish and result in an interrupted movement in opening the shell.

In addition, damage of the edible portion inside can result since the end of the section rotates into the shellfish meat. A further problem with the foregoing manual cutting procedures is that the slicing operation can be very dangerous. The shellfish is typically wet and slippery when dressed often leading to mishandling of the shellfish or slicing implement during the slicing step and sometimes resulting in injury to the operator.

The potential for injury increases as the operator tries to speed up operations as is sometimes called for, and uses less care and caution than he/she would otherwise exercise.

Accordingly, the prior art devices heretofore proposed whether of the compressive or cutting or other types have proven to be unsatisfactory.

SUMMARY OF THE INVENTION

The present invention provides an apparatus for cutting through an outer shell of a preselected piece of seafood. Such apparatus includes a first elongated member having a first predetermined shape and a first predetermined length. The first elongated member includes a first handle portion disposed at a first end thereof and a first jaw like portion disposed at a radially opposed second end thereof. The first jaw like portion includes each of a relatively pointed nose and a relatively sharp tapered portion having a plurality of serrations disposed on an upper surface thereof and extending from such nose portion back towards the handle portion for assisting in cutting through such outer shell of such preselected piece of seafood. A second elongated member having a second predetermined shape and a second predetermined length is provided. The second elongated member includes a second handle portion disposed at a first end thereof and a second jaw like portion disposed at a radially opposed second end thereof. The second jaw like portion includes each of a relatively blunt arcuately shaped nose portion and a relatively wide gripping portion for cooperating with such first jaw like portion in cutting through such outer shell of such preselected piece of seafood. There is a first means engageable with each of such first member and such second member intermediate each end thereof for pivotably connecting them together. Further, there is a second means engageable with the handle portion of each of such first member and such second member for biasing the first and the second jaw like members into an open position.

OBJECTS OF THE INVENTION

It is, therefore, one of the primary objects of the present invention to provide an improved apparatus for removing the meat portion of a shellfish from it's shell in a safer and faster manner.

Another object of the present invention is to provide an apparatus for removing the meat portion of a shellfish from it's shell which is relatively simple to use.

Still another object of the present invention is to provide an apparatus for removing the meat portion of a shellfish from it's shell which is relatively sturdy in construction.

Yet another object of the present invention is to provide an apparatus for removing the meat portion of a shellfish from it's shell which is rather inexpensive to manufacture.

A further object of the present invention is to provide an apparatus for removing the meat portion of a shellfish from it's shell which has a long life.

An additional object of the present invention is to provide an apparatus for removing the meat portion of a shellfish from it's shell which can be manufactured from a variety of materials and in a variety of colors.

In addition to the various objects and advantages of the present invention which have been described with some degree of specificity above, it should be noted that various other objects and advantages of the invention will become

Figure 1:
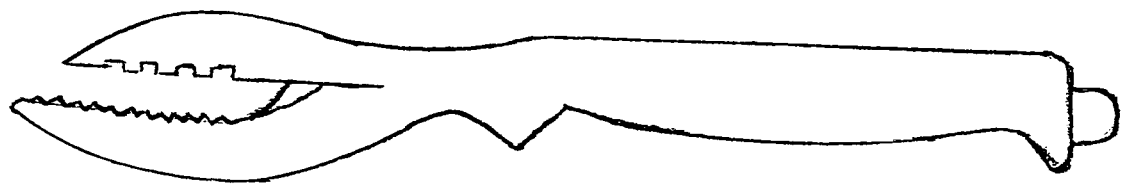
FIG. 1 is side elevation view of a prior art type apparatus presently used to remove the meat portion of a shellfish from it's shell.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing Figures.

Figure 4:
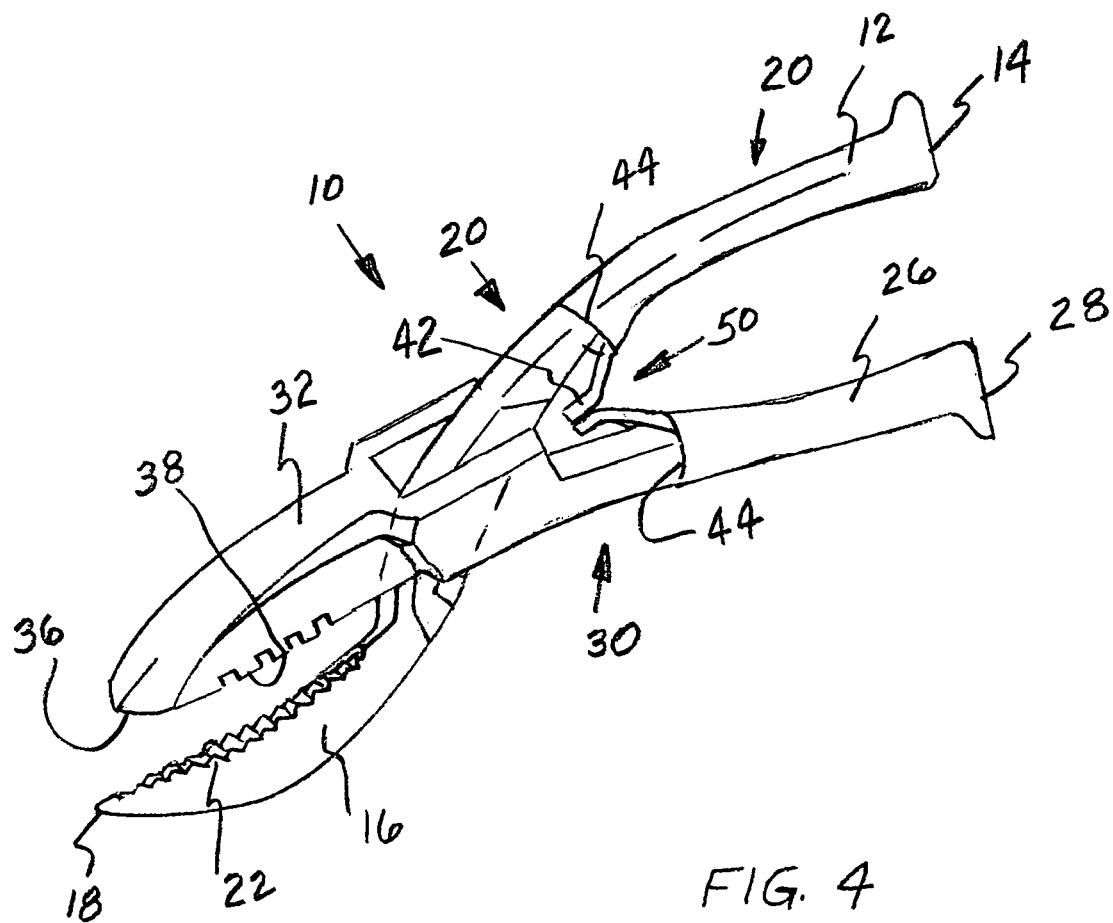
FIG. 4 is top elevation view of another form of a presently preferred embodiment of an apparatus for use in removing the meat portion of a shellfish from it's shell which is similar to the apparatus shown in FIG. 1.
Figure 2:
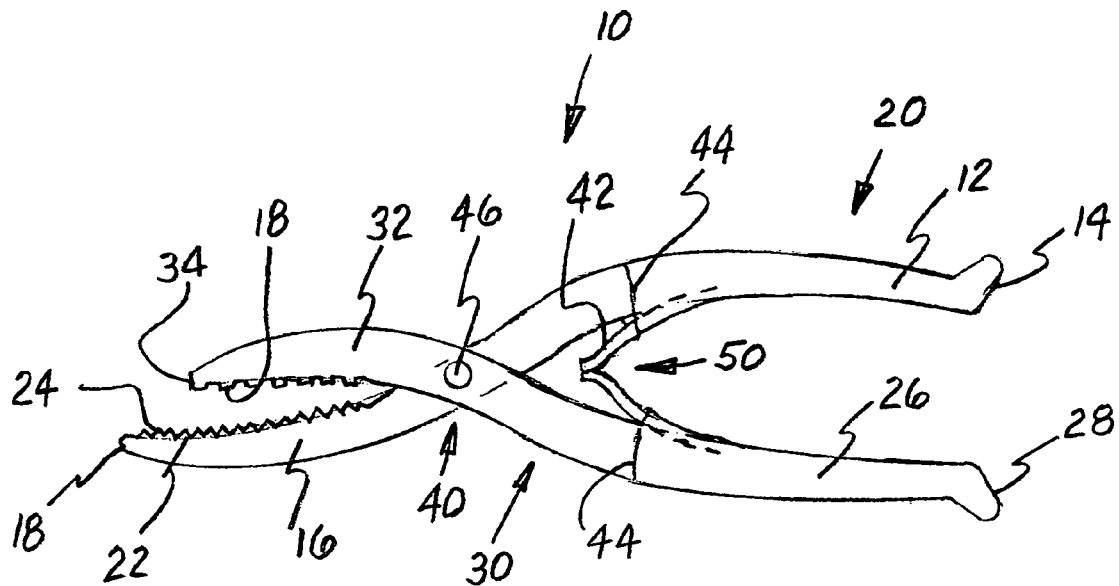
FIG. 2 is side elevation view of a one form of a presently preferred embodiment of an apparatus for use in removing the meat portion of a shellfish from it's shell.
Figure 3:
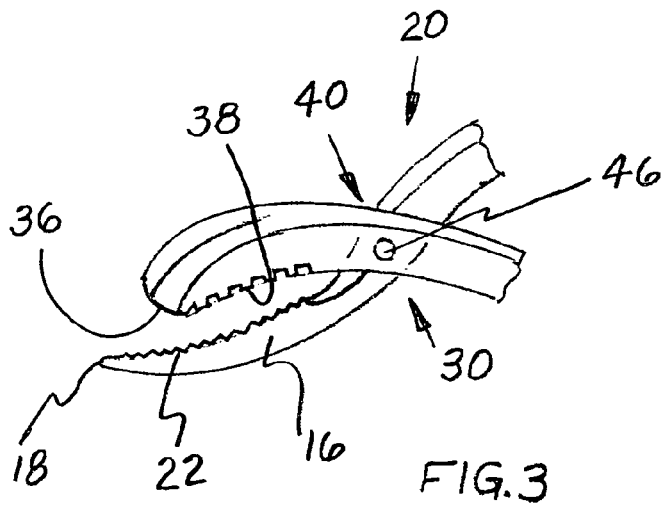
FIG. 3 is a partial view illustrating a presently preferred nose portion of the apparatus illustrated in FIG. 1.

Now refer more particularly to FIGS. 2–4 of the drawings. Illustrated therein is an apparatus, generally designated 10, for cutting through an outer shell (not shown) of a preselected piece of seafood (not shown).

Such apparatus 10 includes a first elongated member, generally designated 20, having a first predetermined shape and a first predetermined length. The first elongated member 20 has a first handle portion 12 disposed at a first end 14 thereof and a first jaw like portion 16 disposed at a radially opposed second end 18 thereof. Such first jaw like portion 16 includes each of a relatively pointed nose portion 22 and a relatively sharp tapered portion having a plurality of serrations 24 disposed on an upper surface thereof. In a presently preferred embodiment of the invention, these serrations 24 extend from such pointed nose portion 22 back toward the handle portion 12 for assisting in cutting through such outer shell of such preselected piece of seafood.

Apparatus 10 further includes a second elongated member, generally designated 30, having a second predetermined shape and a second predetermined length. Such second elongated member 30 including a second handle portion 26 disposed at a first end 28 thereof and a second jaw like portion 32 disposed at a radially opposed second end 34 thereof. In the presently preferred embodiment of the invention, the second jaw like portion 34, as best seen in FIG. 3, includes each of a relatively blunt arcuately shaped nose portion 36 and a relatively wide gripping portion 38 for cooperating with such first jaw portion 16 in cutting through such outer shell of such preselected piece of seafood.

The final essential element of the apparatus 10, according to the present invention, is a pivot means, generally designated 40. Pivot means 40 is engageable with each of such first elongated member 20 and such second elongated member 30 intermediate each respective end thereof for pivotably connecting them together.

In the presently preferred embodiment of the invention, such apparatus 10 will further include a biasing means, generally designated 50, engageable with the handle portion 12 and 26 of each of the first elongated member 20 and the second elongated member 30 for biasing such first and second jaw like members 16 and 32 into an open position. The presently preferred biasing means 50 is a spring like member 42.

It is further preferable for such apparatus 10 to further include a cover 44 over at least a portion of at least one of a portion of such first and second handle portions 12 and 26 and at least a portion of such spring like member 42. It is most preferred for such cover 44 to be made of a relatively resilient material to absorb some of the shock encountered in using the apparatus 10. Additionally, it is preferred that such cover 44 is positioned over each of such at least a portion of at least one of a portion of such first and second handle portions 16 and 26, respectively, and at least a portion of the spring like member 42.

According to the present invention, each of the first elongated member 20 and the second elongated member 30 are produced from a material selected from the group consisting of plastic and metal. In the presently preferred embodiment of the instant invention, such first elongated member 20 and such second elongated member 30 are produced from plastic having a predetermined color.

If such first elongated member 20 and such second elongated member 30 are produced from metal such metal will preferably be selected from the group consisting of steel and aluminum. Aluminum is the presently preferred metal. When steel is used it is preferred that such steel be stainless.

According to the invention, such pivot means 40 is selected from the group consisting of a bolt like member, a pin and a rivet.

Preferably, such pivot means 40 is a bolt like member 46 which will enable easy replacement of at least one of such first and such second elongated members 20 and 30, respectively, in the event one of them becomes broken.

While in accordance with the patent statutes both a presently preferred as well as a number of alternative embodiments of the instant invention have been described in such full, clear and concise terms as to enable a person skilled in the relevant art to practice the invention it should be understood that various other adaptations and modifications can be made to the invention without departing from either the spirit of the invention or the scope of the appended claims.

I claim:

1. An apparatus for cutting through an outer shell of a preselected piece of seafood, said apparatus comprising:
   (a) a first elongated member having a first predetermined shape and a first predetermined length, said first elongated member including a first handle portion disposed at a first end thereof and a first jaw like portion disposed at a radially opposed second end thereof, said first jaw like portion including each of a relatively pointed nose and a relatively sharp tapered portion having a plurality of serrations disposed on an upper surface thereof and extending from said nose portion back toward said handle portion for assisting in cutting through such outer shell of such preselected piece of seafood;
   (b) a second elongated member having a second predetermined shape and a second predetermined length, said second elongated member including a second handle portion disposed at a first end thereof and a second jaw like portion disposed at a radially opposed second end thereof, said second jaw like portion including each of a relatively blunt arcuately shaped nose portion and a relatively wide gripping portion for cooperating with said first jaw portion in cutting through such outer shell of such preselected piece of seafood; and (c) a pivot means engageable with each of said first member and said second member intermediate each end thereof for pivotably connecting them together.

2. An apparatus, according to claim 1, wherein said apparatus further includes a biasing means engageable with said handle portion of each of said first elongated member and said second elongated member for biasing said first and said second jaw like members into an open position.

3. An apparatus, according to claim 2, wherein said biasing means is a spring like member.

4. An apparatus, according to claim 3, wherein said apparatus further includes a cover over at least a portion of at least one of a portion of said first and second handle portions and at least a portion of said spring like member.

5. An apparatus, according to claim 4, wherein said cover is over each of said at least a portion of at least one of a portion of said first and second handle portions and at least a portion of said spring like member.

6. An apparatus, according to claim 4, wherein said cover is resilient.

7. An apparatus, according to claim 1, wherein each of said first elongated member and said second elongated member are produced from a material selected from the group consisting of plastic and metal.

8. An apparatus, according to claim 7, wherein said each of said first elongated member and said second elongated member are produced from said plastic, said plastic having a predetermined color.

9. An apparatus, according to claim 7, wherein said each of said first elongated member and said second elongated member are produced from said metal and said metal is selected from the group consisting of steel and aluminum.

10. An apparatus, according to claim 9, wherein said steel is stainless.

11. An apparatus, according to claim 7, wherein said each of said first elongated member and said second elongated member are produced from said aluminum.

12. An apparatus, according to claim 1, wherein said pivot means is selected from the group consisting of a bolt like member, a pin and a rivet.

13. An apparatus, according to claim 12, wherein said pivot means is a bolt like member which will enable easy replacement of at least one of said first and said second elongated members in an event of one of said first and said second elongated members becomes broken.

14. An apparatus, according to claim 1, wherein said first predetermined length of said first elongated member is greater than said second predetermined length of said second elongated member.

\* \* \* \* \*